United States Patent
Marason et al.

(10) Patent No.: US 9,332,181 B1
(45) Date of Patent: May 3, 2016

(54) LOW DISTORTION WIDE ANGLE LENS FOR DYNAMIC PERSPECTIVE

(71) Applicant: Amazon Technologies, Inc., Seattle, WA (US)

(72) Inventors: Eric Gifford Marason, San Francisco, CA (US); Miguel Virgen, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/533,663

(22) Filed: Nov. 5, 2014

(51) Int. Cl.
| | |
|---|---|
| *G02B 13/18* | (2006.01) |
| *G02B 9/58* | (2006.01) |
| *H04N 5/232* | (2006.01) |
| *G02B 13/00* | (2006.01) |
| *G02B 9/34* | (2006.01) |
| *H04N 5/225* | (2006.01) |

(52) U.S. Cl.
CPC .............. *H04N 5/23238* (2013.01); *G02B 9/34* (2013.01); *G02B 9/58* (2013.01); *G02B 13/004* (2013.01); *H04N 5/2257* (2013.01)

(58) Field of Classification Search
CPC ................................ G02B 9/34; G02B 13/004
USPC .......... 359/622, 708, 715, 753, 771, 781, 782
See application file for complete search history.

(56) References Cited

U.S. PATENT DOCUMENTS

| | | |
|---|---|---|
| 8,520,316 B2 | 8/2013 | Huang et al. |
| 8,810,918 B2 | 8/2014 | Li |
| 2003/0174410 A1* | 9/2003 | Noda ................ G02B 13/04 359/680 |
| 2014/0247507 A1 | 9/2014 | Tsai |

OTHER PUBLICATIONS

Doushkina. Scanning Lenses: F-Theta Lens. Center for Applied Competitive Technologies (CACT) Class 13. The Optics Institute. Apr. 10, 2007. http://oisc.net/ZemaxFiles/Class%2013/F-Theta.pdf.
Special Optics. Scanning Lens Theory. Oct. 3, 2008. http://specialoptics.com/pdf/wp_scanning_lens_theory.pdf (last visited Dec. 17, 2014).
Starizona. Starizona's Telescope Basics: Optical Aberrations. Archived Dec. 19, 2013. http://starizona.com/acb/basics/equip_optics101_curvature.aspx.

* cited by examiner

*Primary Examiner* — William Choi
(74) *Attorney, Agent, or Firm* — Seyfarth Shaw LLP; Ilan N. Barzilay; David A. Klein

(57) ABSTRACT

An f-theta lens system for a camera that provides a wide field-of-view, relatively low distortion, and a compact footprint. The lens system comprises four molded plastic elements with seven aspheric surfaces. Within a total thickness of 2.5 millimeters, the system is able to provide an image that is 1.2 millimeters across with a horizontal field of view of 127 degrees. The images produced by the system are well-suited for use with conventional face tracking algorithms designed to process rectilinear images produced by cameras with a narrower field of view.

20 Claims, 8 Drawing Sheets

LOW DISTORTION WIDE ANGLE LENS FOR DYNAMIC PERSPECTIVE

BACKGROUND

Cameras have become a ubiquitous feature on mobile devices such as cellular telephones. Many such devices include multiple cameras, such as a high resolution camera on the back of the device for digital photography, and a lower resolution camera on the front of the device next to the display to support video telephony and the taking of self-portraits.

BRIEF DESCRIPTION OF DRAWINGS

For a more complete understanding of the present disclosure, reference is now made to the following description taken in conjunction with the accompanying drawings.

DETAILED DESCRIPTION

In the consumer market for cell phones, tablets, security systems and other devices where techniques such as facial recognition, dynamic head tracking, etc. are used, there exists a need for a compact, inexpensive camera capable of keeping faces in the field of view as the subjects move about. One way to achieve this passively is to couple a camera sensor with a wide angle lens. But conventional wide angle lenses can be bulky, expensive, and often impart "fisheye" barrel distortion to the image. Moreover, head tracking software is optimized for rectilinear lenses, where straight lines are resolved as straight lines, as opposed to the bending of straight lines into curves due to the barrel distortion introduced by fisheyes. The result is that it is computationally burdensome for imaging/tracking software to follow a face as it moves and distorts beyond recognition. Even if the barrel distortion is removed from an image by pre-processing, feature detail is reduced in distorted areas of the image, complicating facial recognition and tracking.

Figure 1:
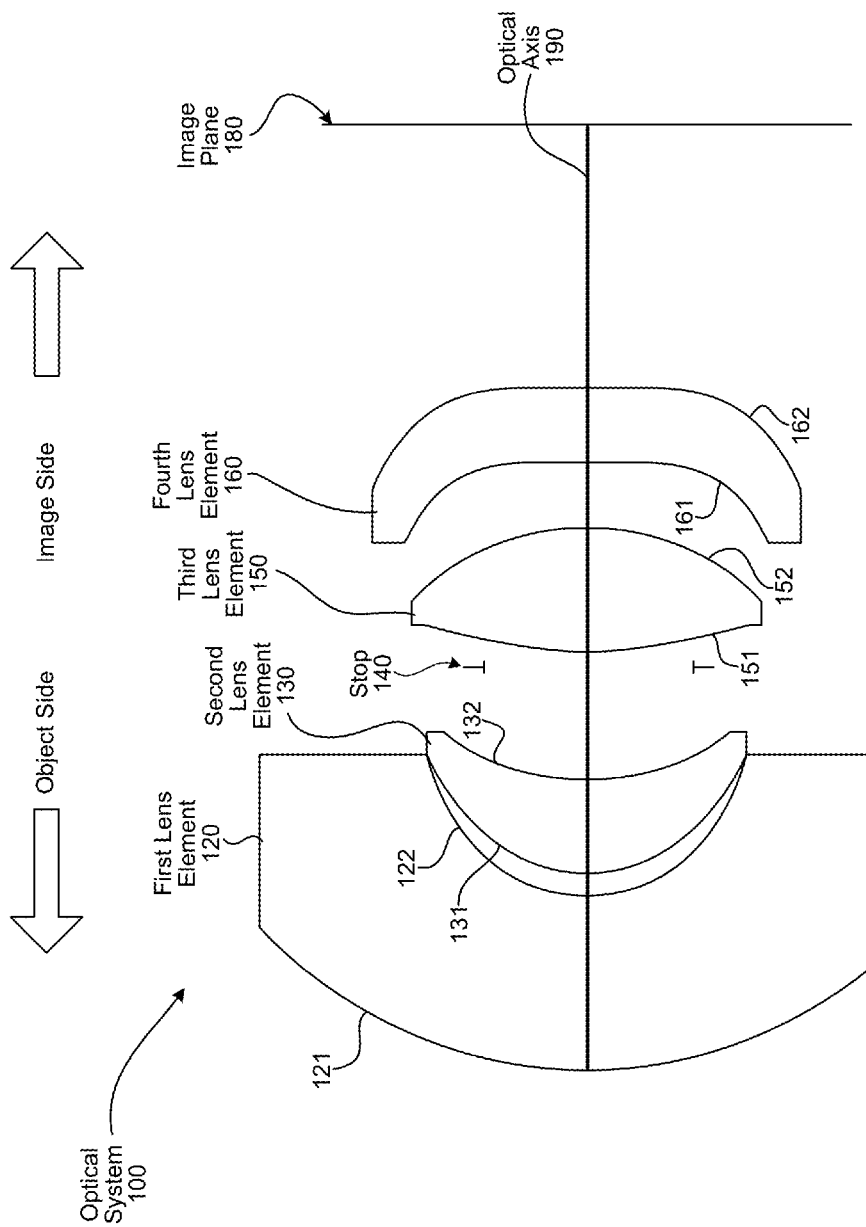
FIG. 1 illustrates a cross-section of an optical system providing a high field of view and low distortion.

As an alternative to wide-angle lenses that rely on software-based solutions to reduce distortion, FIG. 1 illustrates an optical lens system 100 that provides a large field-of-view, relatively low distortion, and a compact footprint. The optical lens system 100 comprises four lens elements with seven aspheric surfaces. An example embodiment of the optical lens system discussed below uses molded plastic lens elements and has a total thickness (also known as a total "track") of approximately 2.5 millimeters (including the distance to the image sensor/plane) and provides an undistorted image that is 1.2 millimeters across with a horizontal field of view of 127 degrees. The "horizontal" field of view is relative to the horizontal of the image/image sensor (e.g., the edge of a square sensor or the longer edge of a rectangular sensor), as compared to a diagonal field of view sometimes used in the art (which would be a larger angle). The small size and ability to manufacture the aspheric elements out of injection-molded plastic enable the use of the optical system 100 in mass-produced, low cost consumer electronic devices.

The combined lens system 100 acts as an "F-theta" lens. F-theta lenses are commonly used in mirror-driven laser scanner systems, although those lenses typically only support scan angles in the range of +/−20 to 28 degrees (approximating a field of view of 40 to 56 degrees). Scanning systems use F-theta lenses to illuminate a target with a laser, with a scanning mirror positioned behind the lens. F-theta lenses are distinguished from other lens because the image height is proportional to the scan angle (theta). In comparison, with ordinary lenses, the image height is proportional to a tangent of the scan angle. Whereas in the absence of distortion, the position of a spot focused through a conventional lens is dependent on the product of the focal length and the tangent of the deflection angle (theta), with an F-theta lens, the position of the focused spot can be made dependent on the product of the focal length, thereby simplifying positioning of the focused spot on a target. These characteristics of F-theta lenses enable a constant scanning speed by the laser, with the laser scanning at a constant speed at both the center of the lens and its periphery.

Achieving F-theta in a lens designed for capturing wide-angle images is difficult. Cameras on cellular telephones and tablet computer ordinarily have a small field of view. With a small field of view, the difference in the images captured by F-theta lenses and F-tan(theta) lenses is small. As such, F-tan(theta) lenses are used to capture rectilinear images due to their compact design and relative simplicity. However, if designing a camera to cover an entire room with a field of view greater than ninety degrees using an F-tan(theta) lens, distortion grows to produce the "fisheye" effect, creating significant barrel distortion. Even with digital post-capture image processing correction, the degree of distortion produces an unevenness in the resolution of the image data that makes fisheye lenses poorly suited for facial recognition/head tracking. In comparison, as described herein, an F-theta lens can be engineered for wide angles (greater than ninety degrees) while providing an evenness to the distortion across most of a captured image, with the unevenness and image vignetting localized in the corners.

In head tracking/facial recognition applications, the motion of the subject is likely to remain on or near a spherical or cylindrical surface with a radius of one-third meter to a few meters (i.e., the distance to the subject). For example, the user holds a tablet device at arm's length, and pivots the tablet about an axis that is vertical and in the plane of the tablet. The tablet's camera sees the user's face move at a constant distance across the field of view, also occupying a constant angular width. An f-theta lens in the tablet device's camera assures that the face occupies a constant physical width (i.e., number of pixels) on the image sensor, eliminating distortion, thereby simplifying facial tracking/recognition software requirements. This effect becomes more important for large angles (i.e., wide fields-of-view) because tan(theta) is much greater than theta for large angles.

FIG. 1 shows an optical system 100 including a four-piece F-theta lens system. The four-piece F-theta lens system comprises, in order from the object side to the image side: a first lens element 120, a second lens element 130, a third lens element 150, and a fourth lens element 160.

The first lens element 120 has a negative refractive power and is made of a "flint" plastic. The first lens element 120 has a convex object-side surface 121 and a concave aspheric image-side surface 122. Converging lenses have "positive" optical power, while diverging lenses have "negative" power.

Flint glass and flint plastic have a relatively high refractive index and a low Abbe number (high dispersion). The term "flint" is more widely used with glass than with plastic, but refers to the same optical characteristics in each. The Abbe number, also known as the "V-number" of a transparent material, is a measure of the material's dispersion (variation of refractive index with wavelength) in relation to the refractive index, with high values of V indicating low dispersion (low chromatic aberration). In general, although industry definitions somewhat vary, flint glass and plastic can be generally characterized as having an Abbe number of 50 or less, and as having a refractive index between 1.55 and 2.00.

The second lens element 130 has a positive refractive power and is also made of "flint" plastic. The second lens element 130 has a convex aspheric object-side surface 131 and a concave aspheric image-side surface 132.

The third lens element 150 has a positive refractive power and is made of a "crown" plastic. The third lens element 150 has the largest refractive power of the four lens elements of the optical lens system 100. The third lens element 150 has a convex aspheric object-side surface 151 and a convex aspheric image-side surface 152.

Crown glass and crown plastic have a relatively low refractive index and a high Abbe number (low dispersion). The term "crown" is more widely used with glass than with plastic, but refers to the same optical characteristics in each. In general, although industry definitions somewhat vary, crown glass and plastic can be generally characterized as having an Abbe number greater than 50, and as having a refractive index below 1.55.

The fourth lens element 160 has a slightly negative refractive power and is also made of "crown" plastic. However, the fourth lens element 160 may also be constructed to have zero or a slightly positive refractive power. Whether the refractive power is negative, zero, or positive, a magnitude (i.e., absolute value) of the refractive power of the fourth lens element 160 is less than ten percent of a magnitude of the refractive power of the third lens element 150. The fourth lens element 160 has a concave aspheric object-side surface 161 and a convex aspheric image-side surface 162.

The optical system 100 includes an aperture stop 140 located between the second lens element 130 and the third lens element 150. The opening of the aperture stop may have a fixed diameter or an adjustable diameter, and may optionally include an electronic (e.g., LCD) or mechanical shutter.

The first lens element 120 and the second lens element 130 work together to redirect incident light to the pupil/aperture of the stop 140. The third lens element 150 focusses light passing through the stop toward the image plane 180. The fourth lens element 160 is a field flattener lens, shifting focal points to assure that all fields are in focus at the image plane 180. As a "field flattener," the fourth lens element 160 improves sharpness and lowers the distortion, counteracting the Petzval field curvature and distortion (i.e., f-theta distortion) produced by the first, second, and third lens elements, and countering the field-angle dependence of the focal length of the system. The optical system produces substantially no F-theta distortion at the image plane 180.

Field flatteners are conventionally used in astronomy with telescopes (e.g., refractor telescopes), counteracting field curvature and distortion. However, at small field-of-view angles as found in telescopes, the difference between F-theta and F-tan(theta) is small, such that a conventional field flattener can produce low F-theta distortion from a telescope utilizing F-tan(theta) optics.

In comparison, with a wide field-of-view, there is a substantial difference between F-theta and F-tan(theta), which is part of the reason why wide field-of-view lenses are conventionally unable to produce rectilinear images. The wide field-of-view optical system 100 produces a substantially rectilinear image within a circular low-distortion region at the image plane by engineering the combination of the first, second, and third lens elements so that the distortion produced is F-theta distortion, which the fourth lens element is counteracts.

As used herein, "focal length" refers to effective focal length. As known in the art, effective focal length is a value that describes the ability of a lens and/or optical system to focus light, and is the value used to calculate the magnification of a system.

Figure 5:
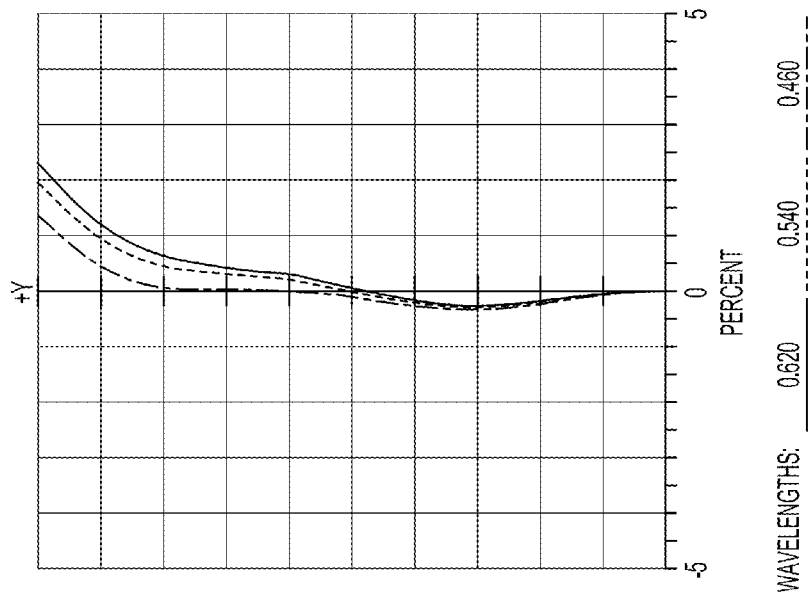
FIG. 5 illustrates distortion curves at the three different wavelengths for the example embodiment of FIG. 2A.

In the optical system 100, the fourth lens elements counteracts the field curvature produced by the first, second, and third lens elements, achieving a distortion of under 2% (as illustrated in FIG. 5). Without the fourth lens element 160, light tends to focus onto a concave spherical surface. The fourth lens element 160 is also responsible for the optical system 100 producing zero (or near zero) F-theta distortion.

The aspheric surfaces of the lenses have a more complex profile than a spherical curve. An aspheric surface can have a wide variety of forms. The aspheric surface of the optical system 100 are expressed in accordance with equation [1] as follows:

$$z(r) = \frac{r^2}{R\left(1 + \sqrt{1 - (1+\kappa)\frac{r^2}{R^2}}\right)} + \alpha_2 r^2 + \alpha_4 r^4 + \alpha_6 r^6 + \ldots \quad [1]$$

where the optical axis is presumed to lie in the "z" direction along the optical axis 190, and z(r) is the "sag" of the surface. The sag of the surface is the z-component of the displacement of the surface from the vertex at distance "r" from the optical axis 190. The aspheric coefficients $\alpha_i$ describe the deviation of the surface from the axially symmetric quadric surface specified by the radius of curvature R and the conic constant K, where $\alpha_2$ is the second order aspheric coefficient, $\alpha_4$ is the fourth order aspheric coefficient, $\alpha_6$ is the sixth order aspheric coefficient, and so on.

Figure 2A:
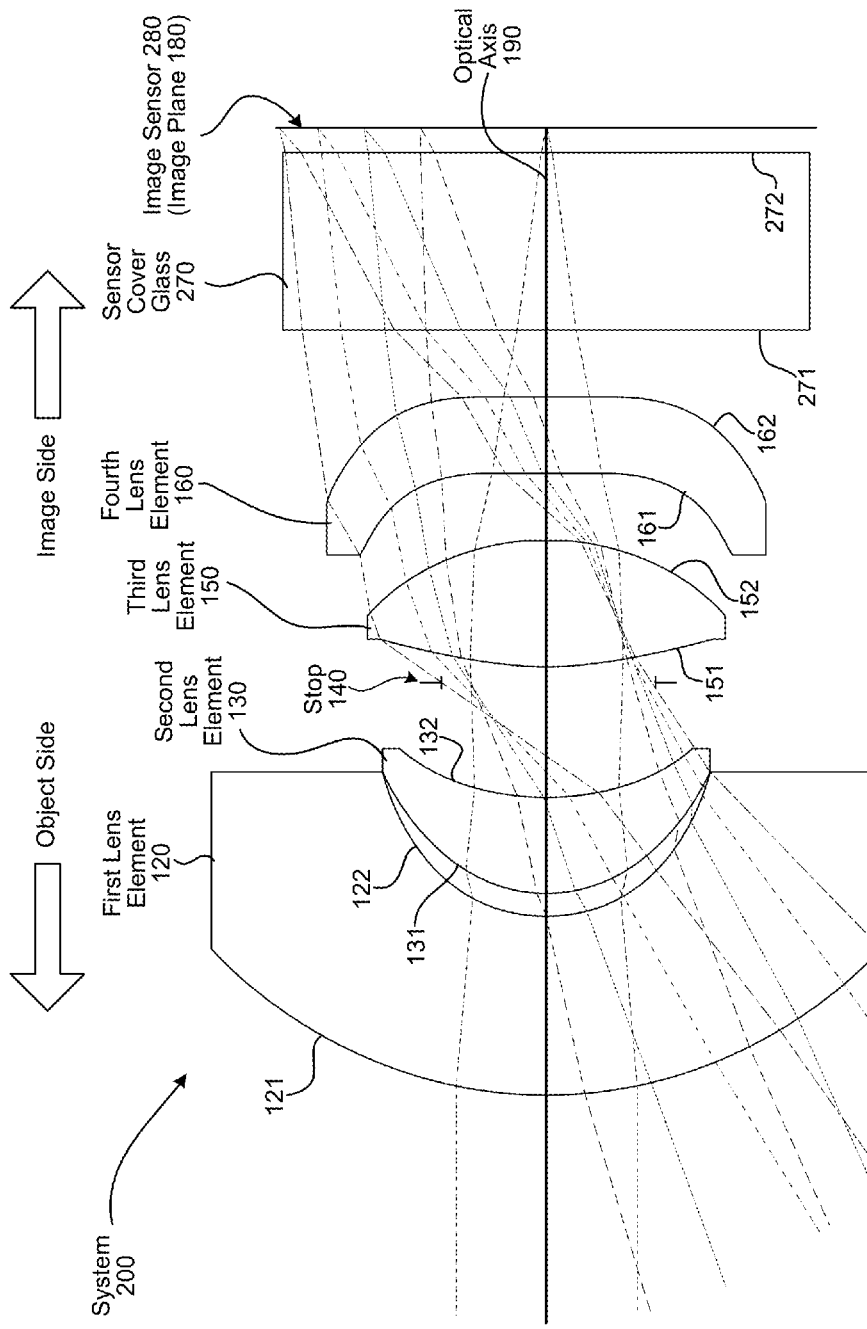
FIGS. 2A and 2B illustrate the path of light rays through a system including an example embodiment of the optical system of FIG. 1.
Figure 2B:
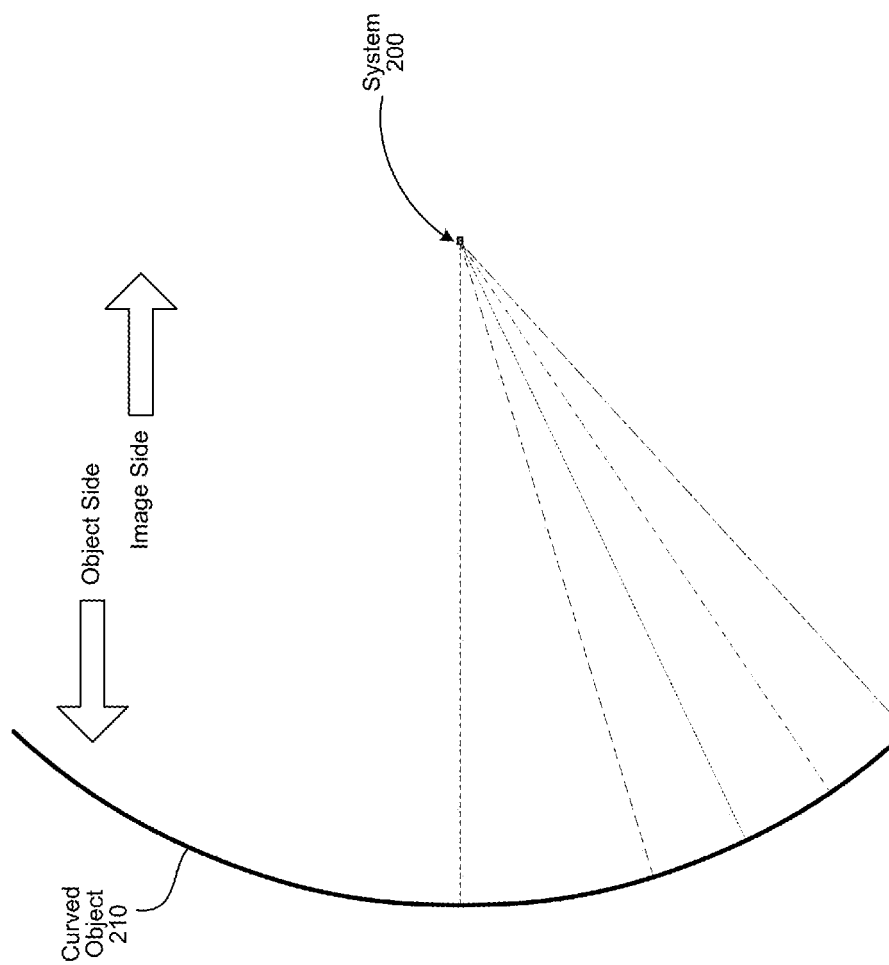

FIGS. 2A and 2B (collectively referred to as "FIG. 2") illustrate a plurality of ray traces through an example system 200 with and a curved object 210 use to model the system. The system 200 includes an example embodiment of the optical system 100, and also includes an image sensor 280 arranged at the image plane 180 and a cover glass 270 over the sensor 280. The cover glass 270 is located between the image-side surface 162 of the fourth lens element 160 and the image plane 180. The total axial length along the optical axis 190 from the object 210 to the image plane 180 is 302.16308 millimeters.

Figure 3:
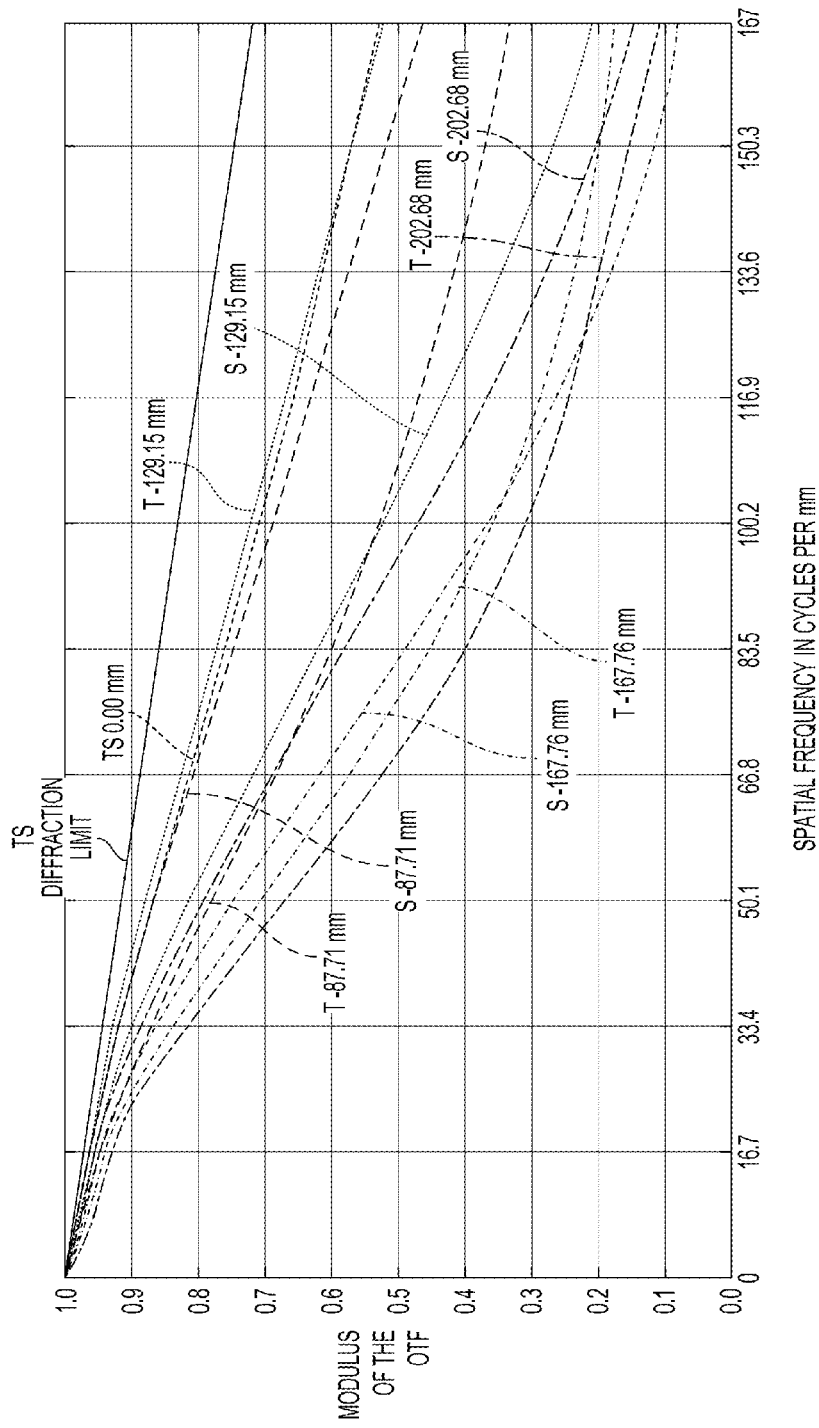
FIG. 3 illustrates a diffraction modulation transfer function (MTF) of the example embodiment of FIGS. 2A and 2B.

FIG. 3 illustrates a diffraction modulation transfer function (MTF) for the example embodiment of the optical system 100 arranged in the system 200 of FIG. 2. The line patterns used for the ray traces in FIG. 2 correspond to the line patterns used in the MTF plots in FIG. 3. The MTF plots follow the "S" sagittal (radial) and "T" tangential direction data at various distances along the curved object 210, for polychromatic wavelength data in a range of 0.4600 to 0.6200 microns. The horizontal axis is the spatial frequency in cycles per millimeter, and the vertical axis is the absolute value of the modulus of the optical transfer function (OTF). The MTF curves exhibit a sharp image for an image sensor 280 with three micron pixels. The Nyquist frequency for the 3.0 micron pixels of the image sensor 280 is 83.5 cycles/mm.

Figure 4:
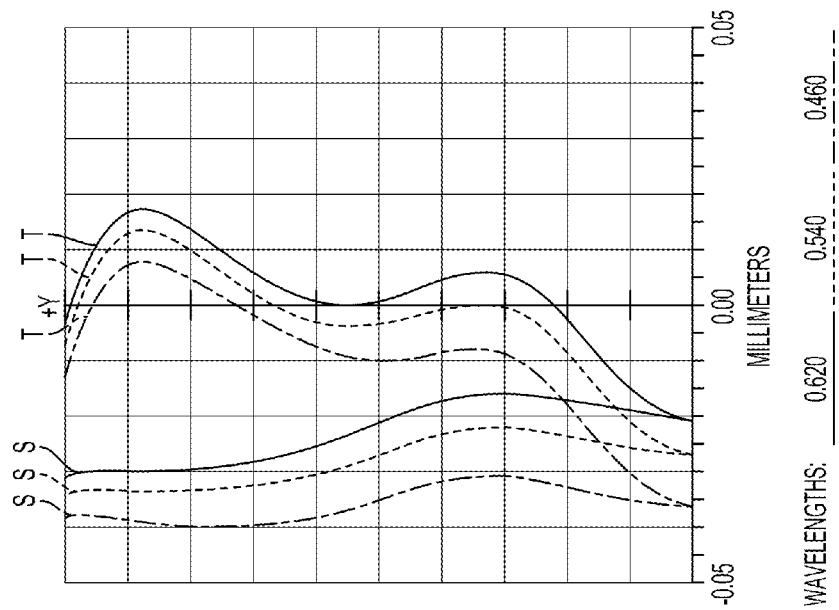
FIG. 4 illustrates field curvature curves at three different wavelengths for the example embodiment of FIG. 2A.

FIG. 4 illustrates field curvature curves and FIG. 5 illustrates F-theta distortion curves at three different wavelengths for the example embodiment of the optical system 100. The maximum field is 202.677 millimeters. The three wavelengths are 0.620 microns, 0.540 microns, and 0.460 microns. Distortion is under 2%.

In the example embodiment of the four-piece F-theta optical lens system 100 in FIG. 2, the focal length of the four-piece F-theta optical lens system is "f," and it satisfies:

$$f=0.9655 \text{ mm}$$

and the F-number "FNO," which is the ratio of the optical system's focal length to the diameter of the entrance pupil/aperture of the stop, satisfies:

$$FNO=2.4$$

and the horizontal field of view "2ω" satisfies:

$$2\omega=127°$$

The diameter of the aperture stop 140 can be reduced, thereby increasing the F-number and resulting in a dimmer captured image due to less light reaching the image sensor (relative to a same duration of exposure).

Referring to the example embodiment in FIG. 2, the focal length "f" of the four-piece F-theta optical lens system 100 and the distance "TL" from the object-side surface 121 of the first lens element 120 to the image sensor 280 along the optical axis 190 satisfy the relation:

$$|f/TL|=0.446$$

However, while this relation characterizes the example embodiment, it depends in part on the thickness of the sensor cover glass 270, which is not part of optical system 100. The cover glass 270 may have a range of thicknesses independent of the optical characteristics of the optical system 100, and the thickness of the cover glass 270 alters the distance TL. Therefore, while this value of |f/TL| characterizes the example embodiment illustrated FIG. 2, the f/TL ratio can be indeterminate as a characteristic of the optical system 100 itself.

The detailed optical data of the example embodiment is shown in Table 1, and the aspheric surface data is shown in Table 2. The refractive index is "nd" and the Abbe number is "vd." The refractive indexes are relative to the wavelength of the helium "d" line (587.56 nm). All units are in millimeters.

TABLE 1

| Surface | Type | Curvature Radius | Thickness | Material | nd | vd |
|---|---|---|---|---|---|---|
| 210 | Object | 300.0000 | 300 | | | |
| 121 | Lens 1 | 1.0235 | 0.402 | Plastic (OKP4HT) | 1.6328 | 23.3444 |
| 122 | | 0.3734(ASP) | 0.050 | | | |
| 131 | Lens 2 | 0.4295(ASP) | 0.214 | Plastic (EP5000) | 1.634 | 23.8447 |
| 132 | | 0.5739(ASP) | 0.258 | | | |
| 140 | Stop | ∞ | 0.038 | | | |
| 151 | Lens 3 | 8.7119(ASP) | 0.282 | Plastic (APL14ML2) | 1.5442 | 55.9143 |
| 152 | | −4.3087(ASP) | 0.151 | | | |
| 161 | Lens 4 | −3.6889(ASP) | 0.168 | Plastic (F52R) | 1.5346 | 56.171 |
| 162 | | −1.1399(ASP) | 0.150 | | | |
| 271 | Cover | ∞ | 0.400 | Glass | 1.52 | 64.2 |
| 272 | | ∞ | 0.050 | | | |
| 280 | Image | ∞ | 0.000 | | | |

TABLE 2

| Surface | Type | Semi-Diameter | Conic κ | $\alpha_2$ | $\alpha_4$ | $\alpha_6$ |
|---|---|---|---|---|---|---|
| 210 | Object | 202.68 | 0 | 0.0000 | 0.0000 | 0.0000 |
| 121 | Lens 1 | 0.7523 | 0 | 0.0000 | 0.0000 | 0.0000 |
| 122 | | 0.3666 | 0 | −0.0932 | 5.2726 | −25.5745 |
| 131 | Lens 2 | 0.3665 | 0 | 0.0317 | 6.0828 | −18.6559 |
| 132 | | 0.3312 | 0 | −0.1924 | 3.7326 | −14.0578 |
| 140 | Stop | 0.2375 | 0 | 0.0000 | 0.0000 | 0.0000 |
| 151 | Lens 3 | 0.3820 | 0 | 0.5037 | −1.2492 | 2.2345 |
| 152 | | 0.4029 | 0 | −0.6927 | −0.9679 | −3.0510 |
| 161 | Lens 4 | 0.4183 | 0 | 0.2220 | −4.6141 | −11.1577 |
| 162 | | 0.4935 | 0 | 0.6515 | −4.6962 | 0.0789 |
| 271 | Cover | 0.5498 | 0 | 0.0000 | 0.0000 | 0.0000 |
| 272 | | 0.5897 | 0 | 0.0000 | 0.0000 | 0.0000 |
| 280 | Image | 0.6038 | 0 | 0.0000 | 0.0000 | 0.0000 |

Thicknesses in Table 1 are measured from one surface to the next, from the object side to the image side, relative to the structure as illustrated in FIG. 2, along the optical axis 190. For example, the first lens element 120 has a radius of 1.0235 mm on its object-side surface 121, a radius of 0.3734 on its aspheric image-side surface 122, a thickness of 0.402 millimeters, and is made of plastic OKP4HT (referring to the transparent plastic's commercial designation).

The semi-diameters in Table 1 are one-half of the diameter of a respective curved surface. The term "semi-diameter" is used instead of "radius" to distinguish the value from the radius of curvature. The semi-diameter is measured from the optical axis 190 to the edge of the continuous curve, the edge of the continuous curve either being a flat portion of the element (e.g., surface 122, surface 132) or the element's outer edge (e.g., surface 121, surface 131). In the MTF plots in FIG. 3, the distances in the "S" sagittal and "T" tangential directions are to the surface 210 and measured perpendicular to the optical axis 190, with the outermost distances being at the semi-diameter of the surface 210.

Contributing to the large field-of-view of the optical system 100, the first lens 120 gathers incident light from a convex object-side surface 121 that has a semi-diameter approximately twice that of the concave image-side surface 122.

As noted above, the fourth lens element 160 provides correction to minimize field curvature and distortion (i.e., f-theta distortion). These characteristics of the fourth lens element 160 depend in part on the fourth order aspheric constants ($\alpha_4$) of the object side surface 161 and the image side surface 162. An attribute of these $\alpha_4$ values are they are approximately equal for the object side surface 161 and the image side surface 162. Another attribute for these $\alpha_4$ values is that $\alpha_4$ for surfaces 161 and 162 satisfies:

$$-6.5<\alpha_4<-3.0$$

The specific structure of the fourth lens element 160 as characterized in Tables 1 and 2 has a slightly negative refractive power. However, as noted above and based upon ray tracing simulation, the fourth lens element may instead be constructed to have a zero or slightly positive refractive power.

Figure 6:
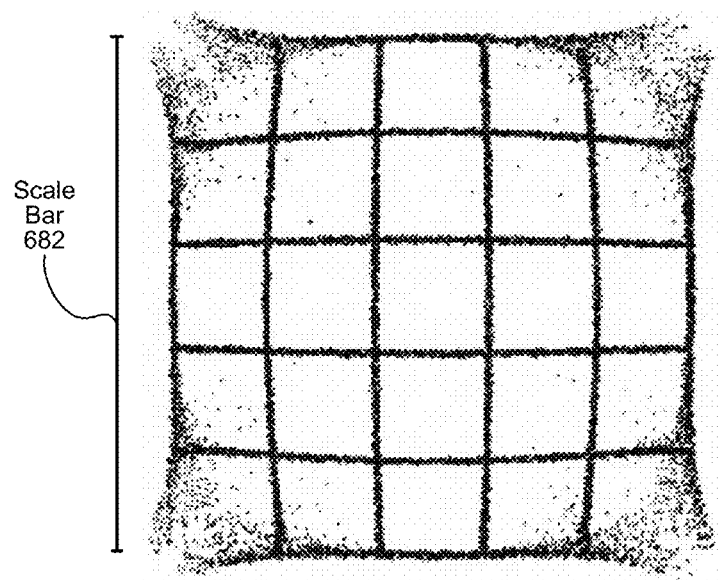
FIG. 6 is a distortion grid characteristic of the example embodiment in FIG. 2A.

FIG. 6 is a distortion grid characteristic of the optical system of the example embodiment in FIG. 2. FIG. 6 is drawn to scale, with a scale bar 682 having a length of 1.20 millimeters. The field position is 0.00 millimeters. Although the four-piece F-theta lens system exhibits mild barrel distortion, by utilizing only a circular area of the optical system 100, the extreme distortion at the corners is avoided. Even though the field-of-view spans one-hundred-twenty-seven degrees, the distortion is consistent and even within a circular area. Based on simulation modelling, the overall optical efficiency of the system is better than 96%.

Figure 7:
FIG. 7 is an example image that simulates the geometric aberrations of the optical system of FIGS. 1 and 2A.

FIG. 7 is an example image that simulates the geometric aberrations of the optical system of FIGS. 1 and 2, consistent with the distortion illustrated in FIG. 6. The field-of-view spans one-hundred-twenty-seven degrees, the object height is 405.3540 millimeters, with a field position of 0.00 millimeters centered on the optical axis 190. The image size at the image plane 180 is 1.2000 millimeters (W) by 1.20000 millimeters (H). While there is significant vignetting and distortion toward the corners, faces across a large circular low distortion region 784 spanning the image are relatively undistorted without requiring post-capture image manipulation to correct geometric aberrations.

The optical system 100 may be scaled larger or smaller to accommodate image sensors with different cross-sectional heights/widths. An objective when scaling the system is to ensure that the sensor diameter is equal to or smaller than the low distortion region 784. If the image sensor is scaled smaller without scaling the optics, some field-of-view may be sacrificed. Preferably, such a smaller image sensor is sized and positioned to maintain a field of view of at least one-hundred-twenty degrees. If the image sensor is scaled larger without scaling the optics, image quality at the edges of the sensor may be corrupted.

Figure 8:
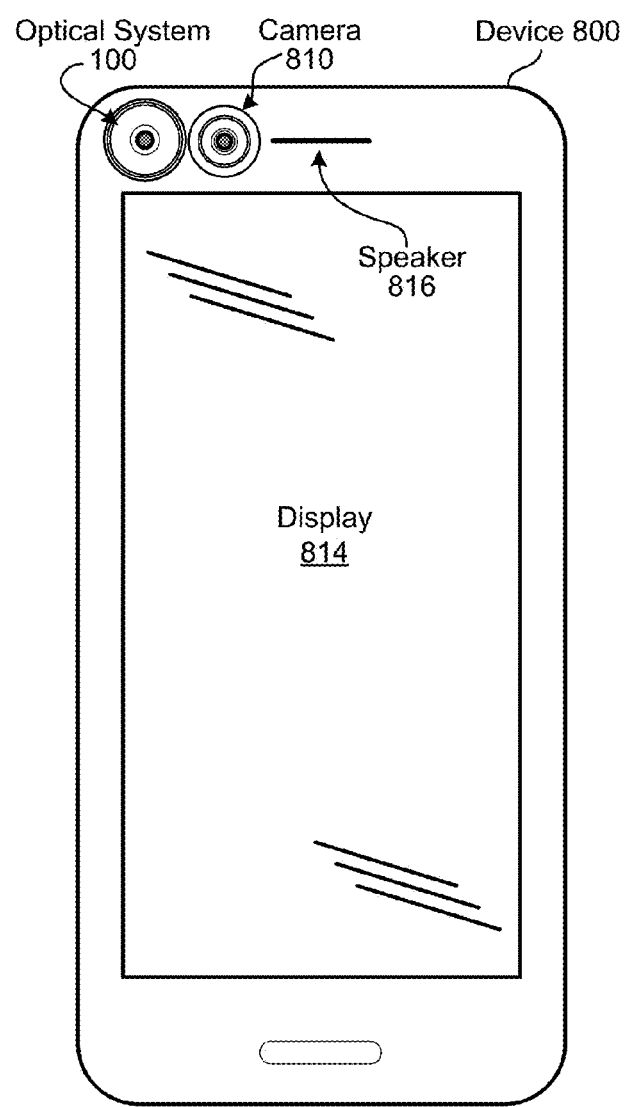
FIG. 8 illustrates mobile electronics device incorporating the optical system of FIG. 1.

FIG. 8 illustrates an example of an electronic device 800 including the optical system 100. The device 800 includes a number of conventional features, such as a display 814 and a speaker 816. The optical system 100 facilitates tracking the heads of one or more people within the field of view of the device. Head tracking in this manner may be used by software executed on the device 800 to (among other things) determine a position of a person relative to the display 814 and to determine the position of people in a room relative to the device 800. The optical system 100 may be paired with a conventional camera 810 to facilitate control of an auto focus system (not illustrated) of the camera 810 by targeting focus based on a face or head identified using the optical system 100. When filming video or still images of a scene in motion, pairing the wide field of view of the optical system 100 with the narrow field of view of the camera 810 may be used to track objects for focus (e.g., faces, heads) prior to the objects entering the narrow field-of-view of the camera 810, in essence providing auto focus software controlling the camera 810 with a degree of peripheral vision.

Figure 9:
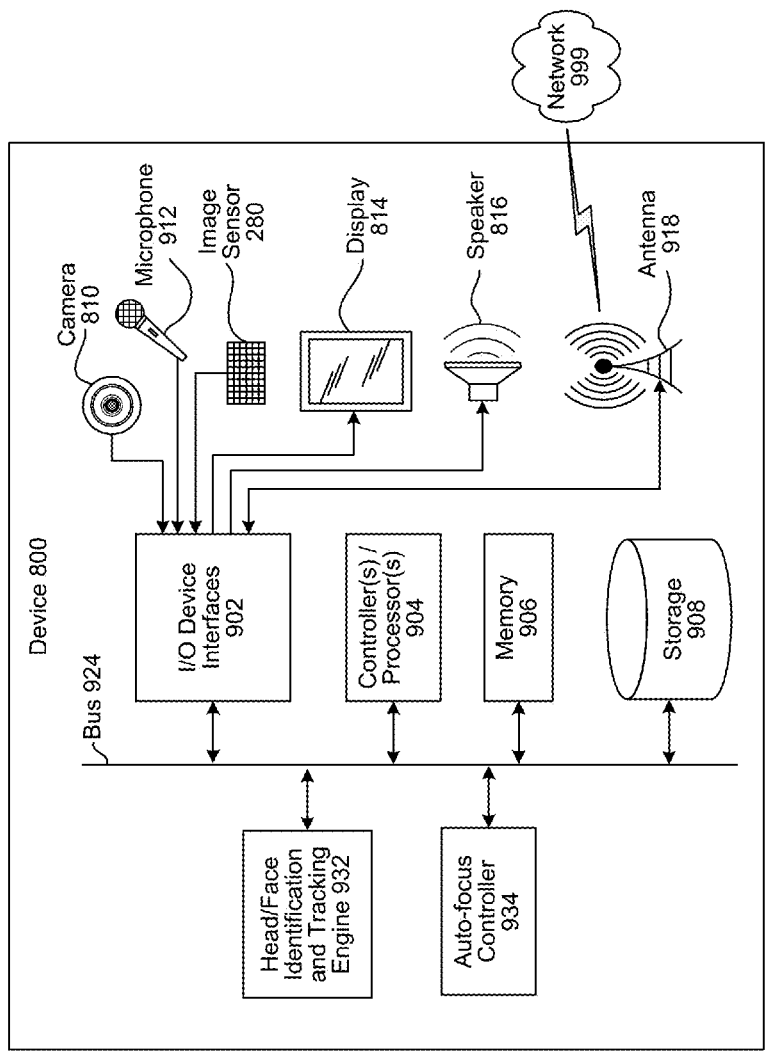
FIG. 9 is a block diagram conceptually illustrating example components of the mobile electronics device of FIG. 8.

FIG. 9 is a block diagram conceptually illustrating example components of the device 800. In operation, the device 800 may include computer-readable and computer-executable instructions that reside in non-volatile storage on the device, as will be discussed further below.

The device 800 includes input/output device interfaces 902. A variety of active components may be connected through the input/output device interfaces 902, such as among other things, the image sensor 280 arranged at the image plane 180 of the optical system 100, the image sensor of the camera 810, a microphone, a display 814, and a speaker. The image sensor 280 and the image sensor of the camera 810 may be of any technology, such as a complementary metal-oxide-semiconductor (CMOS) image sensor or a charge-coupled device (CCD) sensor, and comprises a grid of pixel sensors. The display 814 may also be of any suitable technology, such as a liquid crystal display, an organic light emitting diode display, an electrowetting display, or other suitable component(s).

The input/output device interfaces 902 may also include an interface for an external peripheral device connection such as universal serial bus (USB), FireWire, Thunderbolt or other connection protocol. The input/output device interfaces 902 may also include a connection to one or more networks 999 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Wireless connectivity is illustrated in FIG. 9 through an antenna 918 of the device 800.

The device 800 may include one or more controllers/processors 904, that may each include a central processing unit (CPU) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The device 800 may also include a non-volatile data storage component 908, for storing data and controller/processor-executable instructions (e.g., instructions to perform head or face recognition and/or tracking on images captured by the image sensor 280 arranged at the image plane 180 of the optical system 100). The data storage component 908 may include one or more non-volatile storage types such as solid-state storage (e.g., Flash memory). The device 800 may also be connected to removable or external non-volatile memory and/or storage (such as a removable memory card, memory key drive, networked storage, etc.) through an input/output device interfaces 902.

Computer instructions for operating the device 800 and its various components may be executed by the controller(s)/processor(s) 904, using the memory 906 as temporary "working" storage at runtime. The computer instructions may be stored in a non-transitory manner in non-volatile memory 906, storage 908, or an external device. Alternatively, some or all of the executable instructions may be embedded in hardware or firmware in addition to or instead of software.

The device 800 may include an address/data bus 924 for conveying data among components of the device 800. Each component within the device 800 may also be directly connected to other components in addition to (or instead of) being connected to other components across the bus 924.

The device 800 may include various engines and controllers that utilize data from the image sensor 280. These engines and controllers may include software stored in memory 906 and/or storage 908 to be executed by the controller(s)/processor(s) 904, may include hardware, and combinations such software and hardware.

An example of such an engine or controller is head/face identification and tracking engine 932. As noted above, due to the relatively low geometric aberrations produced by the optical system 100, head and face tracking may be performed over the wide field of view of the F-theta lens system without requiring image processing to convert a fisheye image into a rectilinear image. As such, image resolution within across the low distortion region circle 784 is relatively consistent, such that a conventional head/face identification and tracking algorithm designed to process conventional narrow field-of-view rectilinear image can be used by the engine 932.

Another example of such an engine or controller is auto-focus controller 934. The auto-focus controller 934 receives head/face tracking information from the identification and tracking engine 932 acquired using the fixed-focus wide field of view optical system 100 (from image sensor 280) and uses the information to control the focusing mechanism (not illustrated) of the narrow field of view camera 810. Due to the difference in field of view between the optical system 100 and the camera 810, only a relatively small area toward the center of the circle 784 may map to coordinates of the image sensor of camera 810. As this central low distortion region circle 784 corresponds to an area of low geometric aberration of the optical system 100, mapping coordinates from the image sensor 280 arranged at the image plane 180 of the optical system 100 to the image sensor of the camera 810 is computationally simple. However, the information from the identification and tracking engine 932 also indicates the location of objects outside the camera's field of view. This information reduces that amount of time needed by the auto-focus controller 934 to adjust focus when a new object enters the frame of the camera 810, as there is little-to-no latency involved in identifying and tracking the object.

Multiple devices 800 may be employed in a single system, and different devices may have different components. The optical system 100 and the camera 810 may be remotely located from the processing-related components, with one device 800 capturing images of a scene and another device processing those images (e.g., performing face identification and tracking).

While flint plastic is used for the first lens element 120 and the second lens element 130, one or both may instead be made out of flint glass. While crown plastic is used for the third lens element 150 and the fourth lens element 160, one or both may instead be made out of crown glass.

The concepts disclosed herein may be applied within a number of different devices and computer systems, including, for example, general-purpose computing systems, multimedia set-top boxes, televisions, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of camera optics and lenses should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines/controllers of the device 800 as firmware, such as a complete or partial hardware implementation of the auto-focus controller 934 by an application specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. An apparatus comprising:
a four-piece optical lens system, the four-piece optical lens system comprising, in order from an object side to an image side:
a first lens element having a first refractive power that is negative, a convex object-side surface, and a concave image-side surface, the first lens element being composed of a first material having a first refractive index and a first Abbe number, the concave image-side surface of the first lens element being aspheric;
a second lens element having a second refractive power that is positive, a convex object-side surface, and a concave image-side surface, the second lens element being composed of a second material having a second refractive index and a second Abbe number, both of the convex object-side surface and the concave image-side surface of the second lens element being aspheric;
a third lens element having a third refractive power that is positive, a convex object-side surface, and a convex image-side surface, the third lens element being composed of a third material having a third refractive index and a third Abbe number, both of the convex object-side surface and the convex image-side surface of the third lens element being aspheric; and
a fourth lens element with a fourth refractive power that is negative, a concave object-side surface, and a convex image-side surface, the fourth lens element being composed of a fourth material having a fourth refractive index and a fourth Abbe number, both of the concave object-side surface and the convex image-side surface of the fourth lens element being aspheric; and
an image sensor arranged on the image side of the fourth lens element at an image plane of the four-piece optical lens system,
wherein:
the four-piece optical lens system is an F-theta lens system;
the four-piece optical lens system provides the image sensor with a field-of-view of at least 120 degrees;
a magnitude of the fourth refractive power is less than 10% of a magnitude of the third refractive power;
the fourth lens element is a field flattener;
fourth order aspheric constants α4 of the concave object-side and the convex image-side surfaces of the fourth lens element are approximately equal;
the first refractive index is larger than the third refractive index and is larger than the fourth refractive index;
the second refractive index is larger than the third refractive index and is larger than the fourth refractive index;
the first Abbe number is smaller than the third Abbe number and is smaller than the fourth Abbe number; and
the second Abbe number is smaller than the third Abbe number and is smaller than the fourth Abbe number.

2. The apparatus of claim 1, wherein fourth order aspheric constants α4 of the concave object-side and the convex image-side surfaces of the fourth lens element satisfy:

−6.5<α4<−3.0.

3. The apparatus of claim 1, further comprising an aperture stop between the second lens element and the third lens element.

4. An optical system comprising, in order from an object side to an image side:
a first lens element having a first refractive power that is negative, a convex object-side surface, and a concave image-side surface, the concave image-side surface of the first lens element being aspheric;
a second lens element having a second refractive power that is positive, having a convex object-side surface and a concave image-side surface, both of the convex object-side surface and the concave image-side surface of the second lens element being aspheric;
a third lens element having a third refractive power that is positive, a convex object-side surface, and a convex image-side surface, both of the convex object-side surface and the convex image-side surface of the third lens element being aspheric; and
a fourth lens element having a fourth refractive power, a concave object-side surface, and a convex image-side surface, both of the concave object-side surface and the convex image-side surface of the fourth lens element being aspheric,
wherein:
a magnitude of the fourth refractive power is less than 10% of a magnitude of the third refractive power, and fourth order aspheric constants α4 of the concave object-side and the convex image-side surfaces of the fourth lens element are approximately equal.

5. The optical system of claim 4, wherein the first lens element, the second lens element, the third lens element, and the fourth lens element in combination form an F-theta lens.

6. The optical system of claim 5, arranged to provide a field-of-view of at least 120 degrees at an image plane of the optical system.

7. The optical system of claim 4, wherein the fourth refractive power is negative.

8. The optical system of claim 4, wherein fourth order aspheric constants α4 of the concave object-side and the convex image-side surfaces of the fourth lens element satisfy:

−6.5<α4<−3.0.

9. The optical system of claim 4, wherein the fourth lens element is a field flattener.

10. The optical system of claim 4, wherein:
the first lens element is composed of a first material having a first refractive index and a first Abbe number,
the second lens element is composed of a second material having a second refractive index and a second Abbe number,
the third lens element is composed of a third material having a third refractive index and a third Abbe number,
the fourth lens element is composed of a fourth material having a fourth refractive index and a fourth Abbe number
the first refractive index is larger than the third refractive index and is larger than the fourth refractive index,
the second refractive index is larger than the third refractive index and is larger than the fourth refractive index,
the first Abbe number is smaller than the third Abbe number and is smaller than the fourth Abbe number, and
the second Abbe number is smaller than the third Abbe number and is smaller than the fourth Abbe number.

11. The optical system of claim 4, wherein:
the first material is flint glass or flint plastic,
the second material is flint glass or flint plastic,
the third material is crown glass or crown plastic, and
the fourth material is crown glass or crown plastic.

12. The optical system of claim 4, wherein:
the first lens element is composed of a first plastic,
the second lens element is composed of a second plastic,
the third lens element is composed of a third plastic, and
the fourth lens element is composed of a fourth plastic.

13. The optical system of claim 4, further comprising an aperture stop between the second lens element and the third lens element.

14. The optical system of claim 13, wherein an F-number of the optical system is 2.4 or larger.

15. The optical system of claim 13, wherein the focal length of the optical system is approximately 0.97.

16. An apparatus comprising:
an optical system; and
an image sensor arranged on an image side at an image plane of the optical system,
wherein the optical system comprises, in order from an object side to the image side:
a first lens element having a first refractive power that is negative, a convex object-side surface, and a concave image-side surface, the concave image-side surface of the first lens element being aspheric;
a second lens element having a second refractive power that is positive, having a convex object-side surface and a concave image-side surface, both of the convex object-side surface and the concave image-side surface of the second lens element being aspheric;
an aperture stop;
a third lens element having a third refractive power that is positive, a convex object-side surface, and a convex image-side surface, both of the convex object-side surface and the convex image-side surface of the third lens element being aspheric; and
a fourth lens element having a fourth refractive power, a concave object-side surface, and a convex image-side surface, both of the concave object-side surface and the convex image-side surface of the fourth lens element being aspheric, and
wherein:
the fourth lens element is a field flattener, and
the first lens element, the second lens element, the third lens element, and the fourth lens element in combination form an F-theta lens.

17. The apparatus of claim 16, wherein:
a magnitude of the fourth refractive power is less than 10% of a magnitude of the third refractive power.

18. The apparatus of claim 16, wherein:
fourth order aspheric constants α4 of the concave object-side and the convex image-side surfaces of the fourth lens element are approximately equal, and
the fourth order aspheric constants α4 of the concave object-side and the convex image-side surfaces of the fourth lens element satisfy:

−6.5<α4<−3.0.

19. The apparatus of claim 16, wherein:
the optical system is arranged to provide a field-of-view of at least 120 degrees at the image plane.

20. The apparatus of claim 16, wherein the fourth refractive power is negative.

\* \* \* \* \*